(12) United States Patent
Pladson (10) Patent No.: US 11,717,952 B1
(45) Date of Patent: Aug. 8, 2023

(54) AUXILIARY HANDLE ATTACHMENT FOR A LONG-HANDLED TOOL

(71) Applicant: Reach Right, LLC, Fargo, ND (US)

(72) Inventor: James Pladson, Fargo, ND (US)

( * ) Notice: Subject to any disclaimer, the term of this patent is extended or adjusted under 35 U.S.C. 154(b) by 0 days.

(21) Appl. No.: 18/185,361

(22) Filed: Mar. 16, 2023

(51) Int. Cl.
*B25G 3/20* (2006.01)
*A01B 1/02* (2006.01)
*B25G 1/10* (2006.01)

(52) U.S. Cl.
CPC ............... *B25G 3/20* (2013.01); *A01B 1/026* (2013.01); *B25G 1/10* (2013.01)

(58) Field of Classification Search
CPC ... B25G 3/20; B25G 3/34; B25G 3/26; B25G 3/38; B25G 1/10; A01B 1/026; A01D 34/902; B25F 5/026
See application file for complete search history.

(56) References Cited

U.S. PATENT DOCUMENTS

| | | | | |
|---|---|---|---|---|
| 1,534,075 A * | 4/1925 | Parrish | ................... | A01B 1/026 294/58 |
| 4,155,582 A * | 5/1979 | Reisner | ................... | B25G 3/14 294/58 |
| 4,838,465 A * | 6/1989 | Metzger | ................... | E04G 21/04 222/526 |
| 5,065,475 A * | 11/1991 | Watt | ................... | B25G 1/00 294/58 |
| D347,986 S * | 6/1994 | Booth | ................... | D8/107 |
| 5,331,720 A * | 7/1994 | Beckingham | ............ | A47L 13/00 294/58 |
| 6,601,887 B2 * | 8/2003 | Graves | ................... | A01B 1/026 294/58 |
| D484,023 S * | 12/2003 | Stout | ................... | D8/107 |
| 7,971,914 B1 * | 7/2011 | Pladson | ................... | A01B 1/026 294/58 |
| 8,032,990 B2 * | 10/2011 | Shinma | ................... | B25D 17/04 16/426 |
| 8,181,436 B1 * | 5/2012 | McMillan | ................... | B25G 1/06 56/400.06 |
| 8,562,238 B2 * | 10/2013 | Hasei | ................... | B62K 21/16 403/396 |
| 8,893,355 B2 * | 11/2014 | Longley | ................... | B25G 1/00 294/58 |
| 9,775,272 B1 * | 10/2017 | Gilbert | ................... | A01B 1/026 |
| D948,974 S * | 4/2022 | Chouikh | ................... | D8/10 |
| 2003/0057721 A1 * | 3/2003 | Ducklow | ................... | B25G 1/00 294/58 |

(Continued)

OTHER PUBLICATIONS

Raymond Anthony Products, The RAH! Handle, https://powxr.com/rah_handle/, Mar. 16, 2023, Raymond Anthony Products.

(Continued)

*Primary Examiner* — Jeffrey O'Brien
(74) *Attorney, Agent, or Firm* — Fargo Patent & Business Law; Thomas Kading (57) ABSTRACT

An auxiliary handle attachment includes a first channel member comprising a first channel closed side along a tool axis to receive an elongated shaft of a tool along the tool axis; a first clamp structure attached to the first channel member to clamp the elongated shaft of the tool to the first channel closed side; a body transverse to the tool axis; and a handle that extends from the body.

14 Claims, 10 Drawing Sheets

(56) References Cited

U.S. PATENT DOCUMENTS

| | | | | |
|---|---|---|---|---|
| 2007/0209162 A1* | 9/2007 | McRoberts | ............. | B25F 5/026 |
| | | | | 16/426 |
| 2012/0085205 A1* | 4/2012 | Quick | .................. | A01D 34/824 |
| | | | | 81/489 |
| 2014/0260839 A1* | 9/2014 | Hurley | .................... | B25F 5/026 |
| | | | | 81/489 |

OTHER PUBLICATIONS

GAIM Engineering, Inc., The HEFT Secondary Auxiliary Handle, https://www.gaimproducts.com/the-heft, Mar. 16, 2023, GAIM Engineering, Inc.

* cited by examiner

AUXILIARY HANDLE ATTACHMENT FOR A LONG-HANDLED TOOL

CROSS-REFERENCE TO RELATED APPLICATION(S)

None

BACKGROUND

The present disclosure relates generally to a tool attachment and more specifically to an auxiliary handle attachment for a tool.

Typically, when using long-handled tools, such as shovels, brooms, rakes, hoes, and the like, the user must repeatedly bend over to lift, push, and/or control the tool. This may result in the user having to extend beyond a comfortable range of motion.

SUMMARY

An auxiliary handle attachment according to one disclosed non-limiting embodiment of the present disclosure includes a first channel member comprising a first channel closed side along a tool axis to receive an elongated shaft of a tool along the tool axis; a first clamp structure attached to the first channel member to clamp the elongated shaft of the tool to the first channel closed side; a body transverse to the tool axis; and a handle that extends from the body.

A further embodiment of any of the foregoing embodiments of the present disclosure includes that the first clamp structure comprises a first female member that pivots about a first female member axis and a first male member that pivots about a first male member axis, the first female member axis and the first male member axis parallel to the tool axis.

A further embodiment of any of the foregoing embodiments of the present disclosure includes that the first male member comprises a threaded fastener transverse to the first male member axis.

A further embodiment of any of the foregoing embodiments of the present disclosure includes that the first male member comprises a first wing nut threaded to the threaded fastener.

A further embodiment of any of the foregoing embodiments of the present disclosure includes that the first wing nut comprises a set of wings transverse to the threaded fastener.

A further embodiment of any of the foregoing embodiments of the present disclosure includes that the first wing nut is received within a first slot in the first female member.

A further embodiment of any of the foregoing embodiments of the present disclosure includes a second clamp structure coaxial with the first clamp structure to clamp the elongated shaft of the tool.

A further embodiment of any of the foregoing embodiments of the present disclosure includes that a second channel member comprising a second channel closed side, the first channel closed side aligned with the second channel closed side along the tool axis to collectively receive the elongated shaft of a tool along the tool axis.

A further embodiment of any of the foregoing embodiments of the present disclosure includes that the first channel closed side is contiguous with the second channel closed side.

A further embodiment of any of the foregoing embodiments of the present disclosure includes that the body, the first channel closed side, the second channel closed side, and the handle are integrally formed.

An auxiliary handle attachment according to one disclosed non-limiting embodiment of the present disclosure includes a first channel member comprising a first channel closed side forming a V-shape; a second channel member comprising a second channel closed side forming a V-shape, the first channel closed side aligned with the second channel closed side along a tool axis to collectively receive an elongated shaft of a tool along the tool axis; a first clamp structure attached to the first channel member to clamp the elongated shaft of the tool to the first channel closed side, the first clamp structure comprises a first female member that pivots about a first female member axis and a first male member that pivots about a first male member axis, the first female member axis and the first male member axis parallel to the tool axis; a second clamp structure attached to the second channel member to clamp the elongated shaft of the tool to the second channel closed side, the second clamp structure comprises a second female member that pivots about a second female member axis and a second male member that pivots about a second male member axis, the second female member axis and the second male member axis parallel to the tool axis, the second female member axis coaxial with the first female member axis and the second male member axis coaxial with the first male member axis; a body transverse to the tool axis; and a handle that extends from the body.

A further embodiment of any of the foregoing embodiments of the present disclosure includes that the first male member comprises a first wing nut threaded to a threaded fastener that pivots about the first male member axis and the second male member comprises a second wing nut threaded to a threaded fastener that pivots about the second male member axis.

A further embodiment of any of the foregoing embodiments of the present disclosure includes that the first wing nut is received within a slot in the first female member and the second wing nut is received within a slot in the second female member to clamp the elongated shaft of the tool along the tool axis in response to the first wing nut being threaded against the first female member and the second wing nut being threaded against the second female member.

The foregoing features and elements may be combined in various combinations without exclusivity, unless expressly indicated otherwise. These features and elements as well as the operation thereof will become more apparent in light of the following description and the accompanying drawings. It should be appreciated that however the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
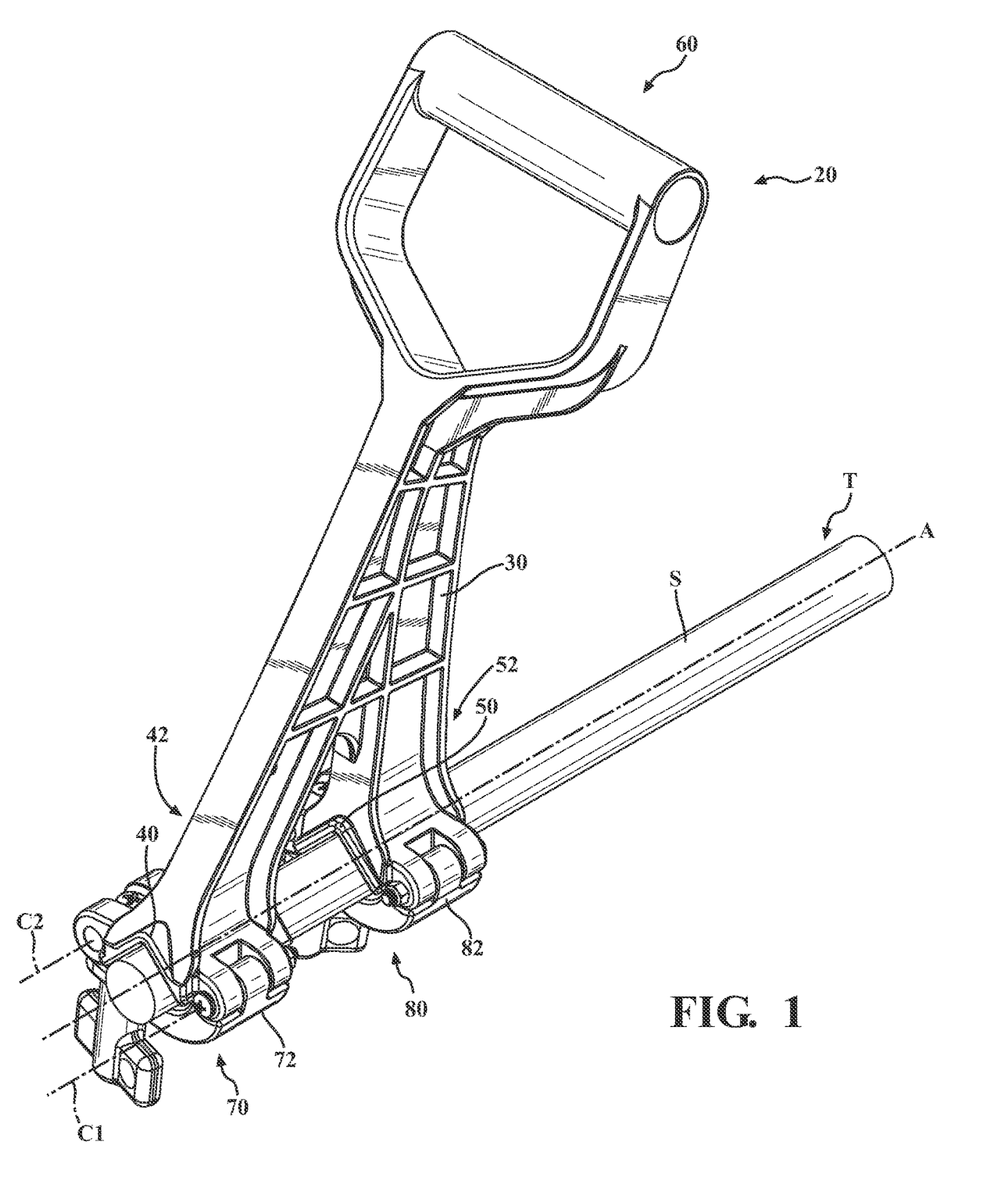
FIG. 1 is a perspective view of an auxiliary handle attachment according to one disclosed non-limiting embodiment.

FIG. 1 schematically illustrates an auxiliary handle attachment 20 for a long-handled tool T, such as shovels, brooms, rakes, hoes, and the like. An elongated shaft S of the long-handled tool T may typically have a diameter from, for example, ½-2 inches.

Figure 2:
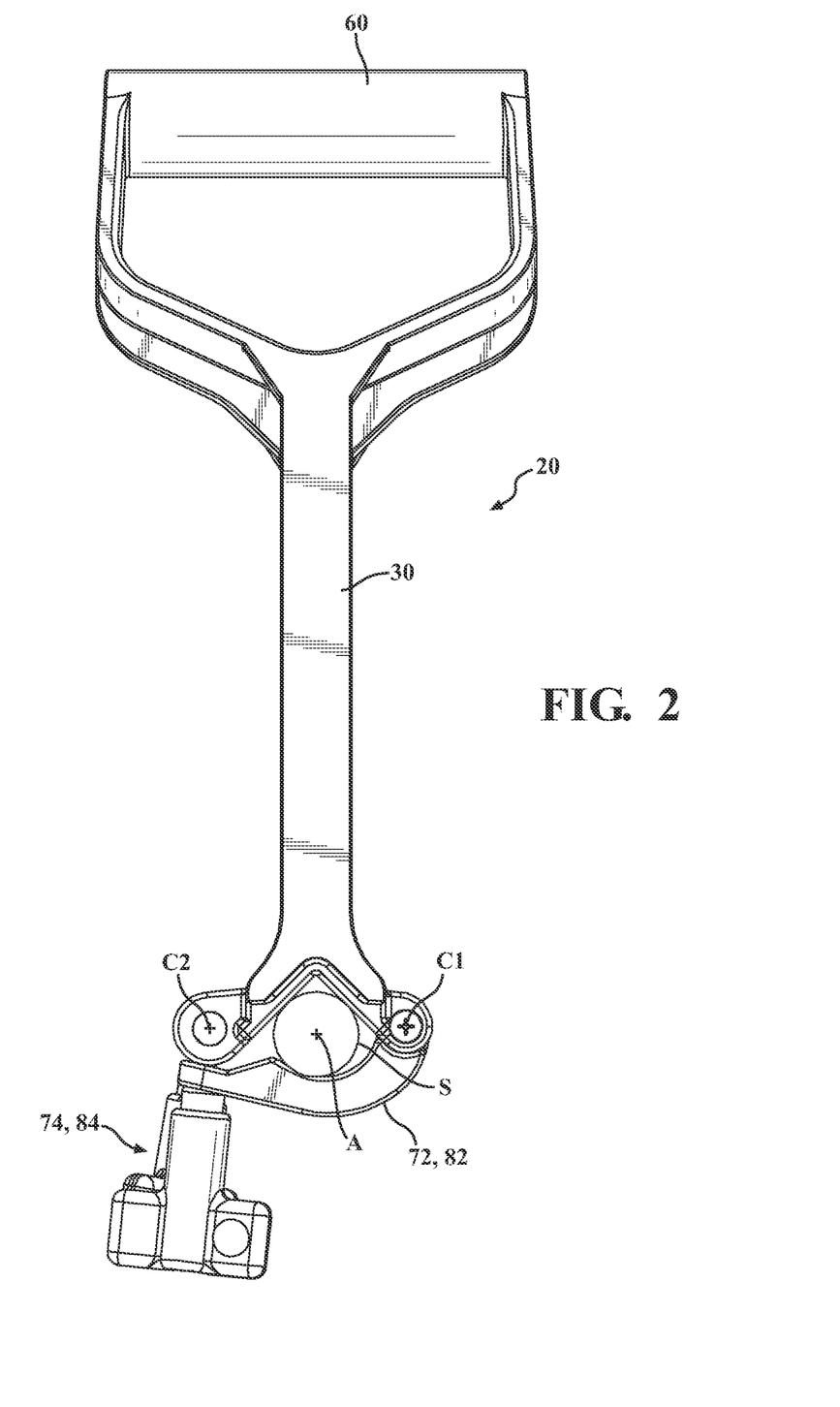
FIG. 2 is a perspective front view of the auxiliary handle attachment.

The auxiliary handle attachment 20 generally includes a body 30 that splits to form a first channel closed side 40 of a first channel member 42 and a second channel closed side 50 of a second channel member 52. The first channel closed side 40 is aligned with the second channel closed side 50 along the tool axis A to collectively receive the elongated shaft S of long-handled tool T. The first channel closed side 40 and the second channel closed side 50 may each be of a V-shape (FIG. 2) to abut the elongated shaft S along the tool axis A.

A handle 60 extends from the body 30 transverse to a tool axis A. The body 30, the first channel closed side 40, the second channel closed side 50 and the handle 60 may be integrally formed and manufactured of, for example, an injected molded non-metallic thermoplastic polymer material such as, for example only, acrylic (PMMA), acrylonitrile butadiene styrene (ABS), nylon polyamide (PA), polycarbonate (PC), polyethylene (PE), polyoxymethylene (POM), polypropylene (PP), polystyrene (PS), thermoplastic elastomer (TPE), thermoplastic polyurethane (TPU), etc. Other materials may include metal and metal alloys. Various ribs and other structures may be incorporated to provide a robust lightweight structure.

A first clamp structure 70 is attached to the first channel member 42 to clamp the elongated shaft S to the first channel closed side 40. A second clamp structure 80 is attached to the second channel member 52 to clamp the elongated shaft S to the second channel closed side 50. The first and second clamp structure 70, 80 each provide for at least three-points of contact to secure the tool T.

The first and second clamp structure 70, 80 each include a female member 72, 82 that pivots about a female member axis C1 and a male member 74, 84 that pivots about a male member axis C2. The female member axis C1 and the male member axis C2 are parallel to the tool axis A. That is, the male member axis C2 and the female member axis C1 of the first and second clamp structure 70, 80 are parallel to the tool axis A.

Figure 3:
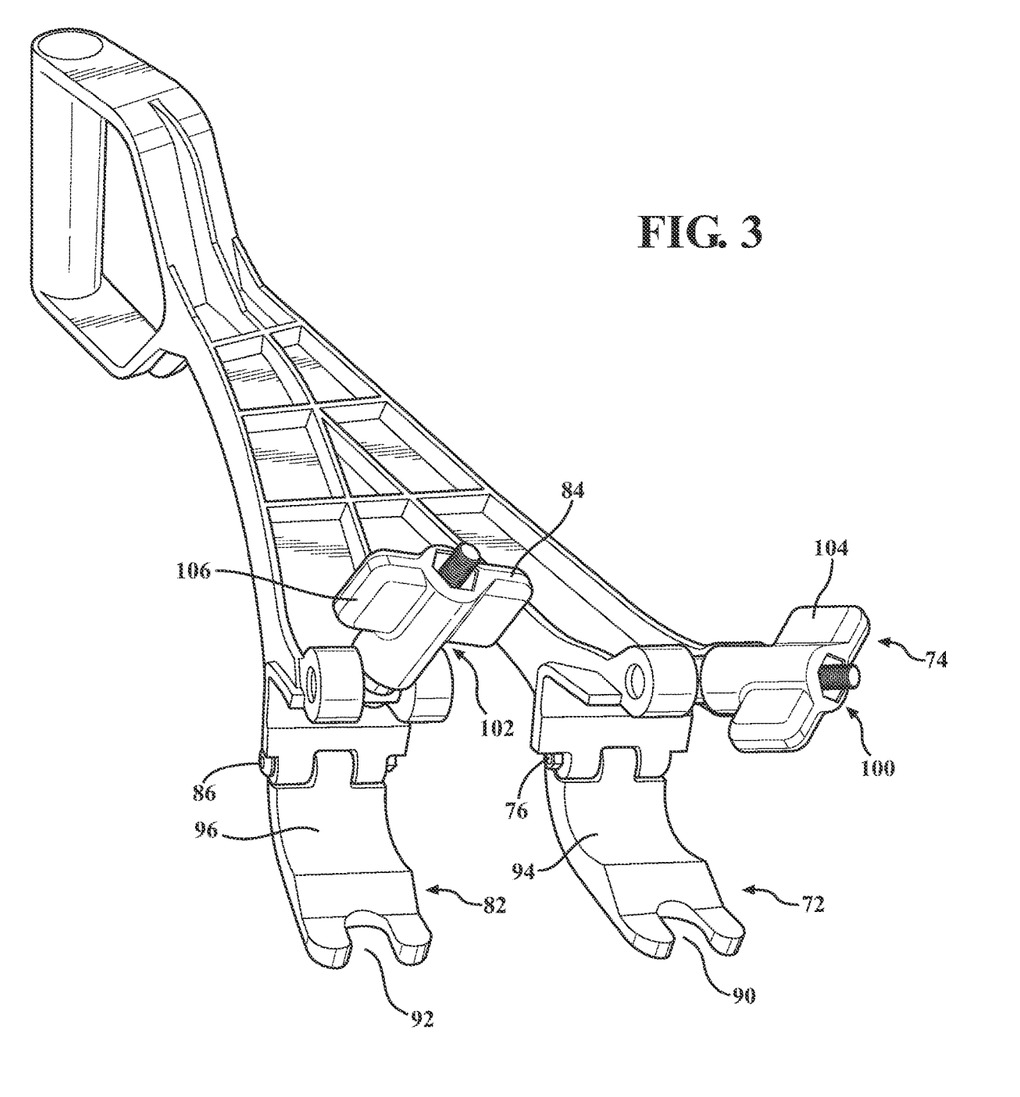
FIG. 3 is a perspective view of the auxiliary handle attachment showing the first and second clamp structure in an open position.
Figure 4:
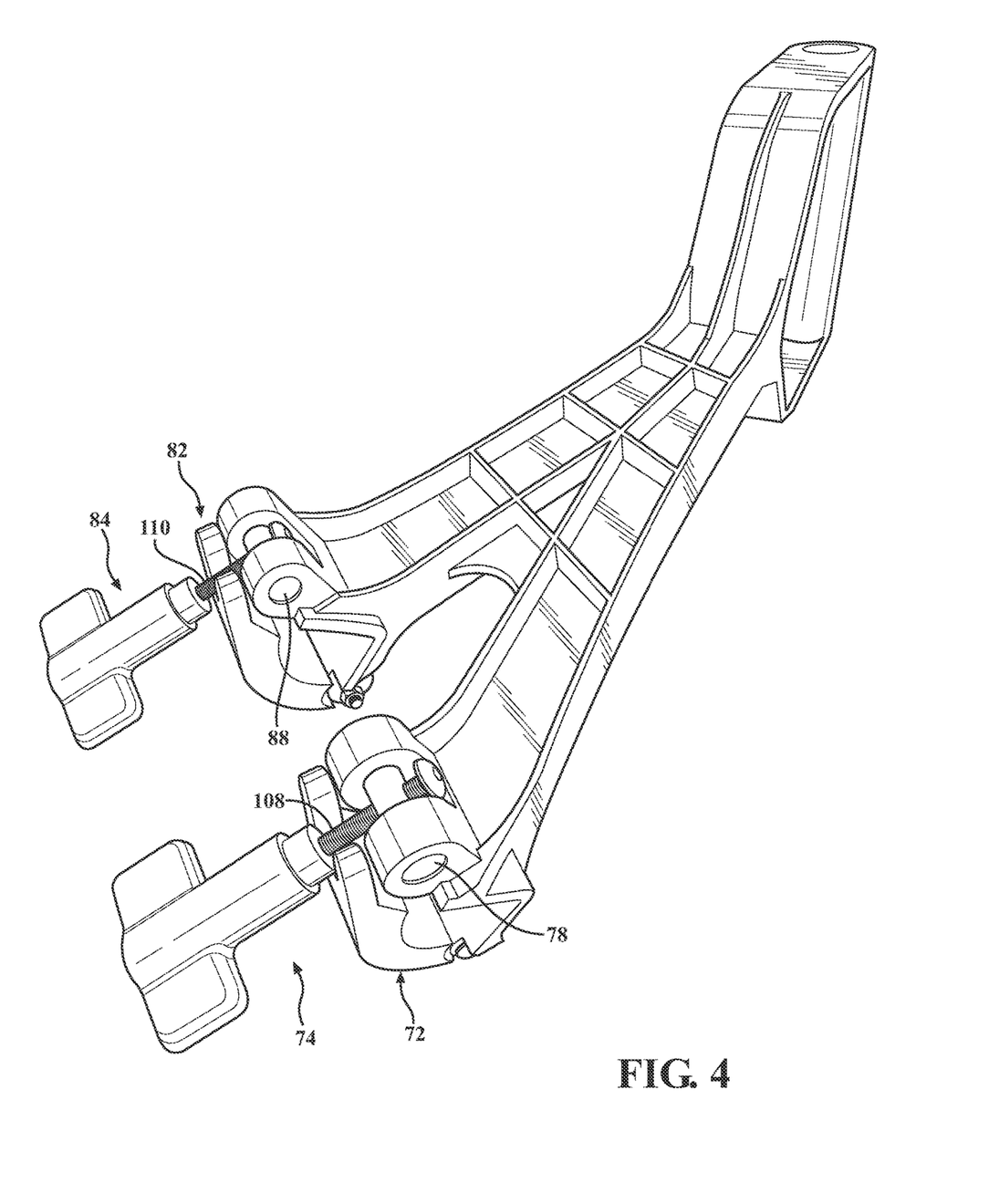
FIG. 4 is a perspective view of the auxiliary handle attachment showing the first and second clamp structure in a partially closed position.

The pivot 76, 86 (FIG. 3) for each female member 72, 82 that form the female member axis C1, and the pivot 78, 88 (FIG. 4) for each male member 74, 84 that form the male member axis C2 may be defined by pins, screws, or other such bushings which are received into the body 30 to provide a strong, secure attachment for the respective first and second clamp structure 70, 80.

Each female member 72, 82 includes a respective slot 90, 92 (FIG. 3) within which is received a respective threaded fastener 108, 110 that supports a wing nut 100, 102 (FIG. 4) of each male member 74, 84. Each female member 72, 82 may include an arcuate surface 94, 96 which engages the elongated shaft S of the tool T and clamps the shaft S against the V-shape of the first channel closed side 40 and the second channel closed side 50. The arcuate surface 94, 96 are opposite the V-shape of the respective first channel closed side 40 and the second channel closed side 50 to provide significant retentive force when the wing nut 100, 102 is threaded toward the respective female member 72, 82.

Figure 5:
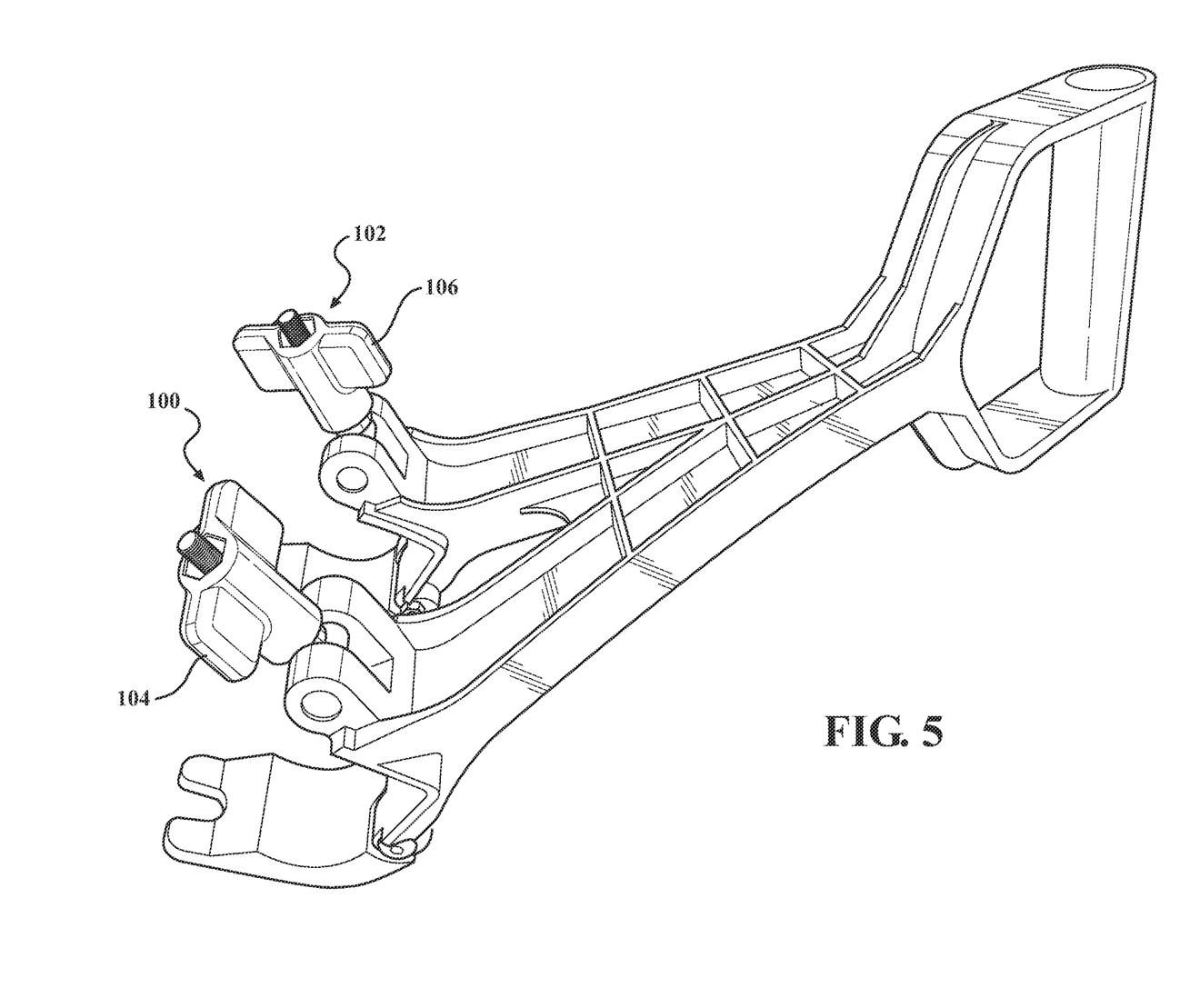
FIG. 5 is another perspective view of the auxiliary handle attachment showing the first and second clamp structure in an open position.
Figure 6:
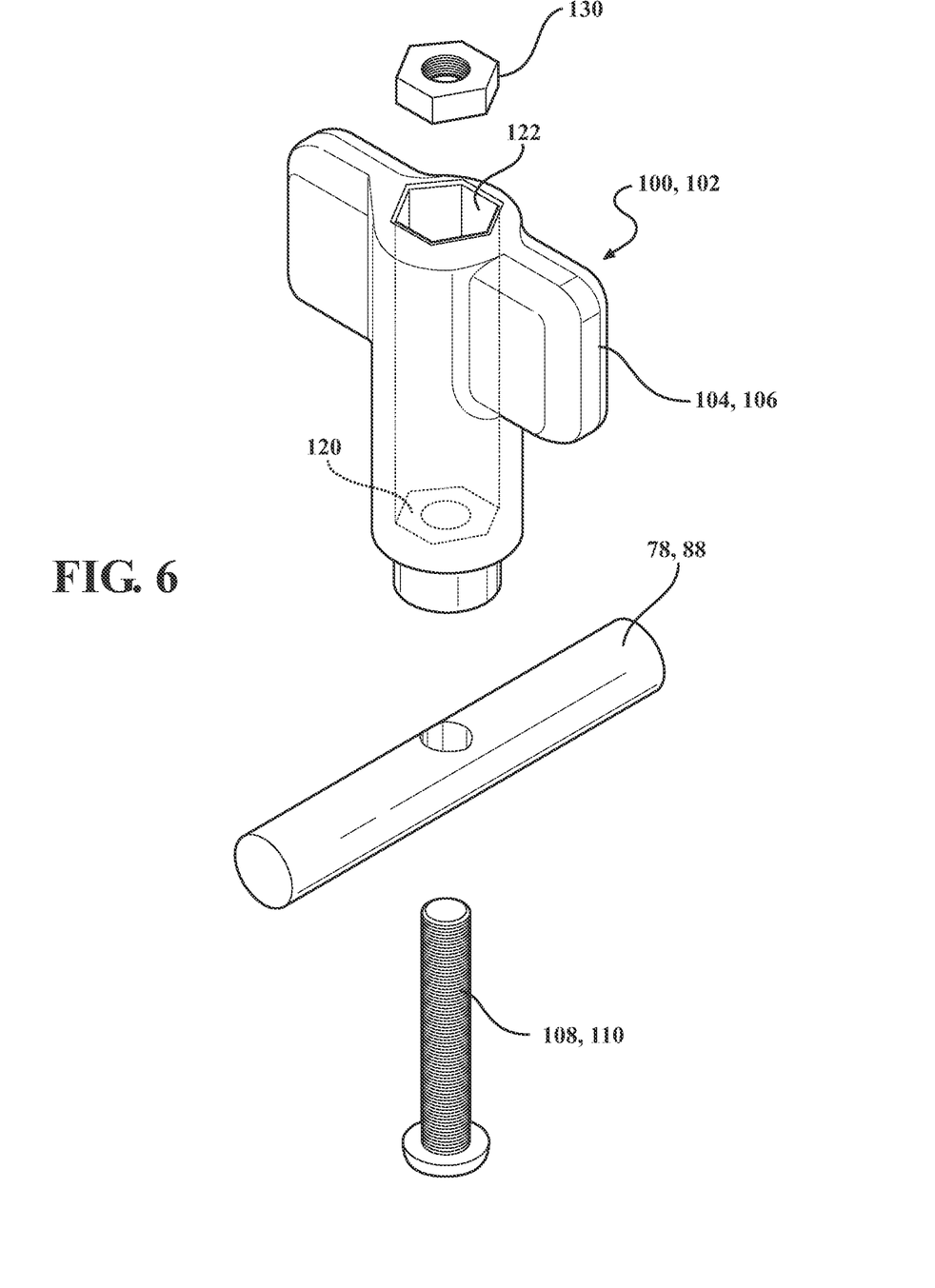
FIG. 6 is a perspective exploded view of a wing nut of each clamp structure.
Figure 7:
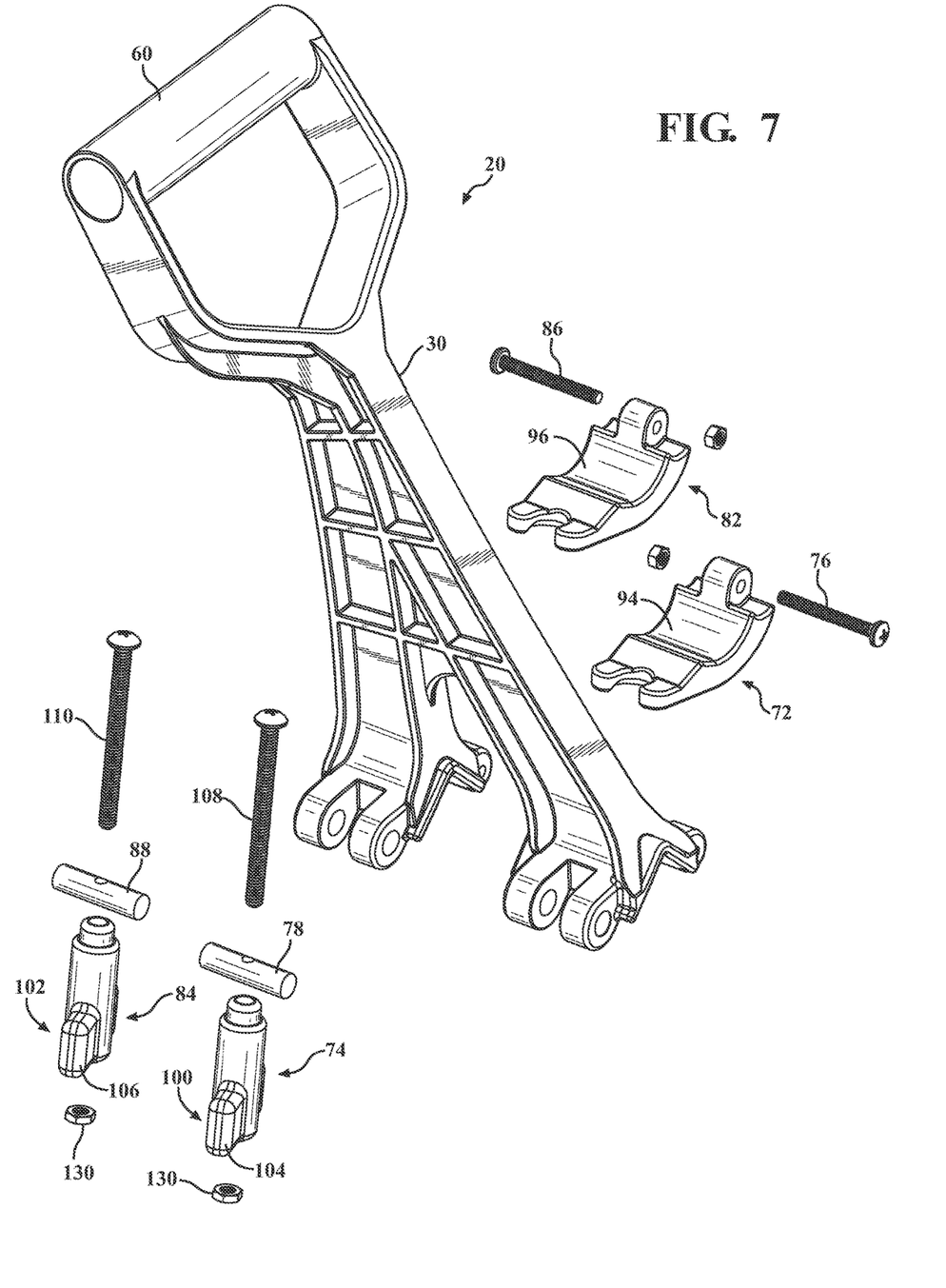
FIG. 7 is an exploded view of the auxiliary handle attachment.

Each wing nut 100, 102 of each male member 74, 84 include a respective set of wings 104, 106 (FIG. 5) which allow for hand tightening of each the wing nut 100, 102 onto the respective threaded fastener 108, 110. In one embodiment, each respective threaded fastener 108, 110 may extend through the pivot 78, 88 and through the respective wing nut 100, 102 such that a nut 130 is retained against a shelf 120 within a corresponding opening 122 in the wing nut 100, 102 (FIG. 6 and FIG. 7), the opening 122 of a size and shape which prevents rotation of the nut 130, for example, a polygonal opening. That is, the wing nut 100, 102 may be hand tightened which tightens the nut 130 onto the respective threaded fastener 108, 110 and tightens the wing nut 100, 102 against the female member 72, 82 as the threaded fastener 108, 110 extends through the slot 90, 92. Alternatively, each respective threaded fastener 108, 110 may be threaded, welded or otherwise secured to the pivot 78, 88.

Figure 8:
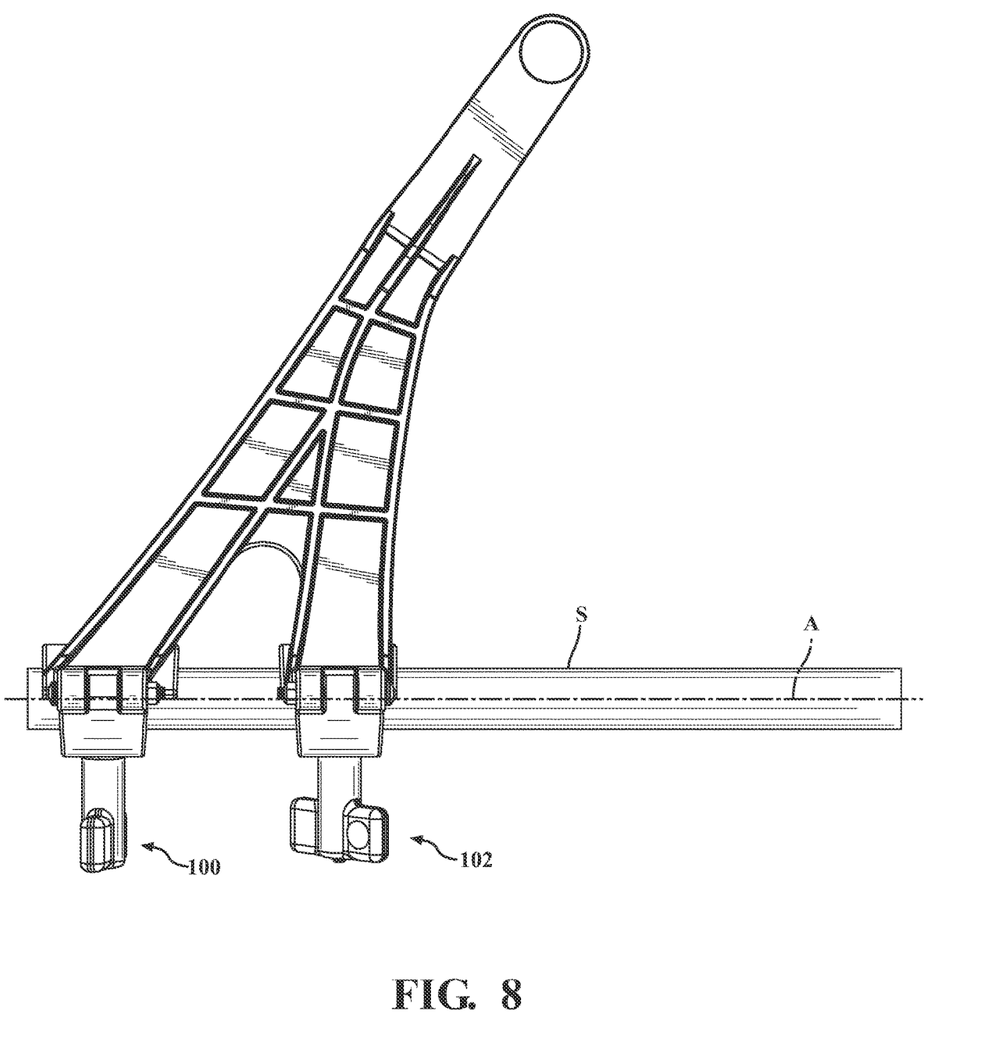
FIG. 8 is a side view of the auxiliary handle attachment.

In use, the elongated shaft S of the long-handled tool T is placed against the first channel closed side 40 and the second channel closed side 50 along the tool axis A. Each female member 72, 82 is then pivoted about the female member axis C1 to partially enclose the elongated shaft S. The male member 74, 84 is then pivoted about the male member axis C2 such that the respective threaded fastener 108, 110 extends through the respective slot 90, 92. Each wing nut 100, 102 is then tightened along the respective threaded fastener 108, 110 such that each wing nut 100, 102 of each male member 74, 84 is engaged against the respective female member 72, 82 which is clamped against the elongated shaft S. The auxiliary handle attachment 20 provides three points of contact per each first and second clamp structure 70, 80 that utilizes the V-shape. The elongated shaft S of the long-handled tool T is thereby secured to the auxiliary handle attachment 20 (FIG. 8).

Figure 9:
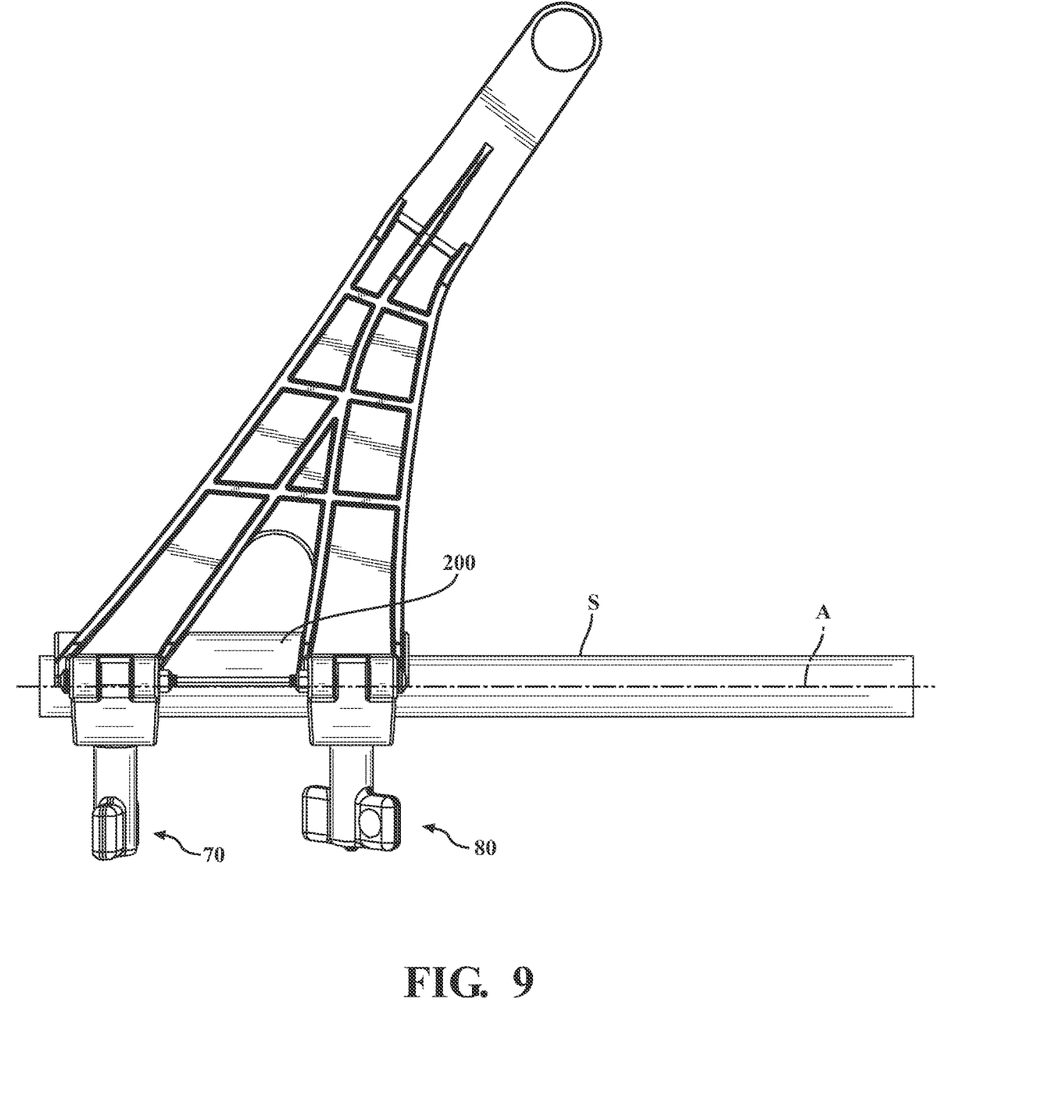
FIG. 9 is a side view of an auxiliary handle attachment according to another disclosed non-limiting embodiment.

With reference to FIG. 9, in another embodiment, the first and second clamp structure 70, 80 are adjacent to a contiguous channel side 200 to receive the elongated shaft S of the long-handled tool T. That is, the discrete first channel member 42 and the second channel member 52 discussed above are essentially merged to form the contiguous channel side 200 which may be, for example, V-shaped, or U-shaped in cross-section along the length thereof. Alternatively, the cross-section may change along the length.

Figure 10:
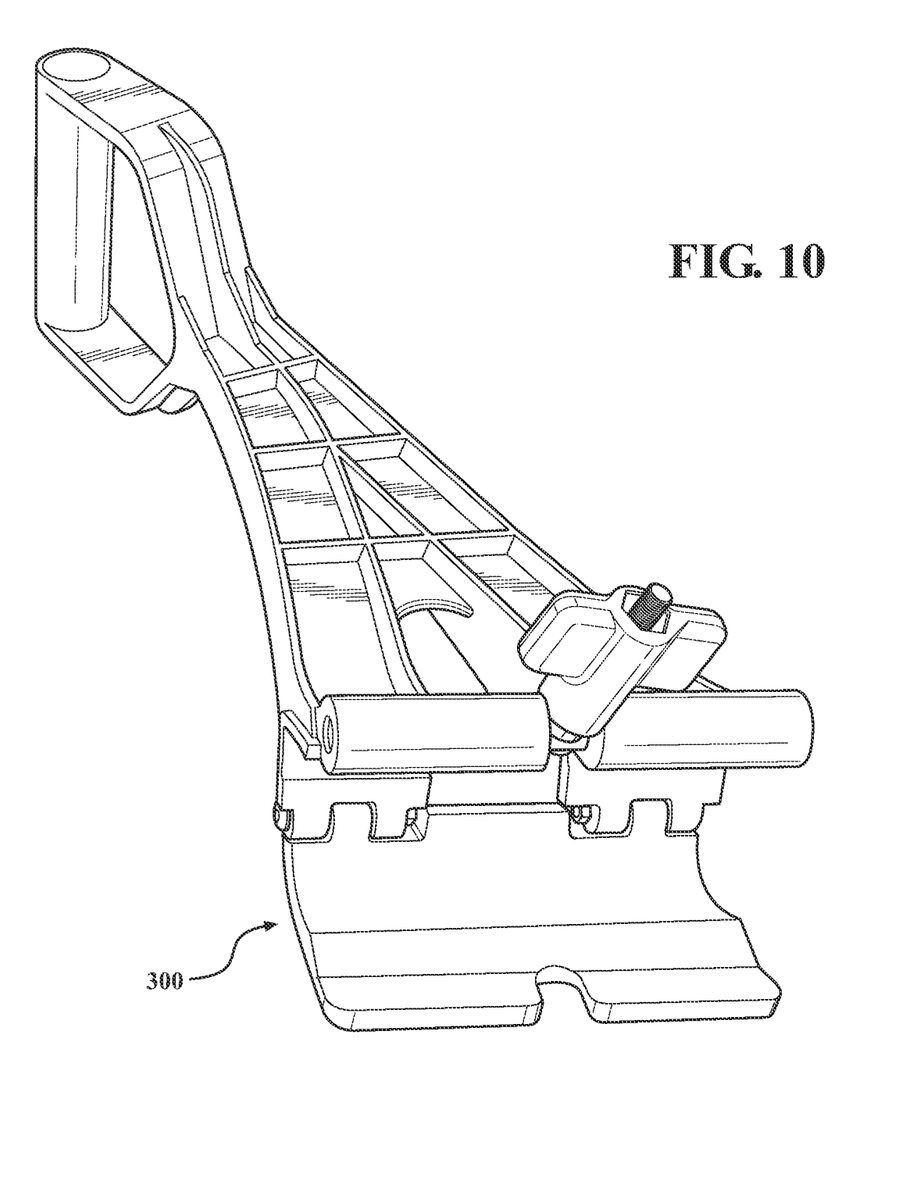
FIG. 10 is a perspective view of an auxiliary handle attachment according to another disclosed non-limiting embodiment.

With reference to FIG. 10, in another embodiment, the auxiliary handle attachment 20 includes a single extended first clamp structure 300 adjacent to a contiguous channel side 200 as shown in FIG. 9.

The auxiliary handle attachment 20 is easily attached and detached from the tool yet provides a secure engagement for heavy use of the tool. The tool may be used by grasping the auxiliary handle attachment 20 with one hand and the shaft with the other hand. The extension of the handle 60 from the body 30 transverse to the tool axis A allows the user to control the tool without requiring the user to bend over substantially.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. An auxiliary handle attachment, comprising:
a first channel member comprising a first channel closed side along a tool axis to receive an elongated shaft of a tool along the tool axis;
a first clamp structure attached to the first channel member to clamp the elongated shaft of the tool to the first channel closed side;
a body transverse to the tool axis; and
a handle that extends from the body;
wherein the first clamp structure comprises a first female member that pivots about a first female member axis and a first male member that pivots about a first male member axis, the first female member axis and the first male member axis parallel to the tool axis.

2. The auxiliary handle attachment as recited in claim 1, wherein the first male member comprises a threaded fastener transverse to the first male member axis.

3. The auxiliary handle attachment as recited in claim 2, wherein the first male member comprises a first wing nut threaded to the threaded fastener.

4. The auxiliary handle attachment as recited in claim 3, wherein the first wing nut comprises a set of wings transverse to the threaded fastener.

5. The auxiliary handle attachment as recited in claim 3, wherein the first wing nut is received within a first slot in the first female member.

6. The auxiliary handle attachment as recited in claim 1, wherein the first channel closed side forms a V-shape.

7. The auxiliary handle attachment as recited in claim 1, further comprising a second clamp structure coaxial with the first clamp structure to clamp the elongated shaft of the tool.

8. The auxiliary handle attachment as recited in claim 7, further comprising a second channel member comprising a second channel closed side, the first channel closed side aligned with the second channel closed side along the tool axis to collectively receive the elongated shaft of a tool along the tool axis.

9. The auxiliary handle attachment as recited in claim 8, wherein the first channel closed side forms a V-shape and the second channel closed side forms a V-shape.

10. The auxiliary handle attachment as recited in claim 8, wherein the first channel closed side is contiguous with the second channel closed side.

11. The auxiliary handle attachment as recited in claim 10, wherein the body, the first channel closed side, the second channel closed side, and the handle are integrally formed.

12. An auxiliary handle attachment, comprising:
a first channel member comprising a first channel closed side forming a V-shape;
a second channel member comprising a second channel closed side forming a V-shape, the first channel closed side aligned with the second channel closed side along a tool axis to collectively receive an elongated shaft of a tool along the tool axis;
a first clamp structure attached to the first channel member to clamp the elongated shaft of the tool to the first channel closed side, the first clamp structure comprises a first female member that pivots about a first female member axis and a first male member that pivots about a first male member axis, the first female member axis and the first male member axis parallel to the tool axis;
a second clamp structure attached to the second channel member to clamp the elongated shaft of the tool to the second channel closed side, the second clamp structure comprises a second female member that pivots about a second female member axis and a second male member that pivots about a second male member axis, the second female member axis and the second male member axis parallel to the tool axis, the second female member axis coaxial with the first female member axis and the second male member axis coaxial with the first male member axis;
a body transverse to the tool axis; and
a handle that extends from the body.

13. The auxiliary handle attachment as recited in claim 12, wherein the first male member comprises a first wing nut threaded to a threaded fastener that pivots about the first male member axis and the second male member comprises a second wing nut threaded to a threaded fastener that pivots about the second male member axis.

14. The auxiliary handle attachment as recited in claim 13, wherein the first wing nut is received within a slot in the first female member and the second wing nut is received within a slot in the second female member to clamp the elongated shaft of the tool along the tool axis in response to the first wing nut being threaded against the first female member and the second wing nut being threaded against the second female member.

* * * * *